3,124,590
RECOVERY OF CYCLOSERINE
Roger L. Harned, Terre Haute, Ind., assignor to Commercial Solvents Corporation, New York, N.Y., a corporation of Maryland
No Drawing. Filed July 6, 1959, Ser. No. 824,907
1 Claim. (Cl. 260—307)

My invention relates to the antibitic cycloserine and, more particularly, it relates to an improved process for recovery of cycloserine from aqueous solutions thereof containing calcium by removal of the calcium as calcium oxalate prior to ion exchange sorption and elution of the antibiotic as described herein.

The antibiotic cycloserine is a broad spectrum antibacterial agent possessing activity against both gram-negative and gram-positive bacteria including mycobacteria such as *Mycobacterium ranae* and has been found to be particularly effective in the treatment of resistant forms of tuberculosis in man. The antibiotic is produced by a species of microorganisms which has been designated *Streptomyces orchidaceous*. The antibiotic is an amphoteric substance possessing weakly acid and weakly basic groups, the antibiotic being very soluble in water, but essentially insoluble in most common organic solvents; such as, glycols, isopropyl alcohol, methanol, ethanol, acetone, hexane, benzene, chloroform, ether, petroleum ether, dioxane, 1-butanol, ethyl acetate and ethylene dichloride. The antibiotic melts with decomposition at about 153° C.

Cycloserine is recovered from aqueous solutions thereof including the nutrient media in which it is produced by adsorption of the antibiotic from the aqueous solution on a strongly acidic cation exchange resin in hydrogen form and elution of the antibiotic from the cation exchange resin with a dilute base, such as NaOH, thereby effecting a considerable concentration of the antibiotic in an aqueous solution from which it can be recovered by precipitation as a water-insoluble metal salt.

In the production of cycloserine, small amounts of calcium carbonate are used in the nutrient medium, the presence of which improves the yield of the antibiotic. The calcium adsorbs on the acidic cation exchange resin along with the antibiotic, thus lowering the amount of antibiotic adsorbed on the resin. When the antibiotic is eluted from the resin with OH ions, the resin is clogged by the precipitation of calcium hydroxide. Following the elution of the antibiotic from the cation exchange resin, it is then necessary to regenerate the resin by the use of an acid. Sulfuric acid is preferred because of its low cost and the speed and completeness with which it regenerates acidic cation exchange resins. However, when the column is regenerated with sulfuric acid, the calcium hydroxide is converted to water-insoluble calcium sulfate which precipitates on the resin, thus adversely affecting the yield of later-produced cycloserine.

I have now discovered an improved process for the recovery of cycloserine from aqueous solutions thereof containing calcium carbonate, including the nutrient media in which it is produced by adsorption of the antibiotic on a strongly acidic action exchange resin and elution of the antibotic from the cation exchange resin. My new process permits the use of sulfuric acid in regenerating the strongly acidic cation exchange resin without adversely affecting the yield of the final product and without the necessity of special cleaning or replacement of the strongly acidic cation exchange resin.

My new process for the recovery of cycloserine from aqueous solutions thereof containing calcium involves essentially adjusting the pH of the aqueous solution of cycloserine hereinafter referred to as "the beer" to between 3.0 and 6.0, adding to the beer oxalic acid in amounts sufficient to form calcium oxalate with the calcium therein, filtering the beer to remove the water-insoluble calcium oxalate and other impurities, adsorbing the antibiotic from the beer on a strongly acidic cation exchange resin in hydrogen form and eluting the antibiotic from the cation exchange resin with a dilute base, thereby effecting a considerable concentration of the antibiotic in an aqueous solution from which it can be recovered by precipitations as a water-insoluble metal salt. The cation exchange resin is then regenerated with sulfuric acid and the above process is repeated.

In carrying out my invention, I first adjust the pH of the above-described beer to between 3.0 and 6.0 with any suitable acid, such as sulfuric acid, phosphoric acid and the like. I prefer to use phosphoric acid. I then add sufficient amounts of oxalic acid to form water-insoluble calcium oxalate with the calcium therein. I prefer to add one mole of oxalic acid for each mole of calcium present in the beer. The precipitated calcium oxalate along with other impurities can be removed from the beer by any suitable means. I prefer to remove the calcium oxalate by filtration. I then adsorb the antibiotic from the aqueous solution on a strongly acidic cation exchange resin, such as an aldehyde-polyhydric phenol resin wherein the activity is due to the presence of sulfonic acid groups. Suitable strongly acidic cation exchange resins which can be employed include Amberlite IR–120, Amberlite IR–105, produced by Rohm & Haas Co., Philadelphia, Pennsylvania, and Dowex 50, produced by Dow Chemical Co., Midland, Michigan. Following adsorption of cycloserine on the strongly acidic cation exchange resin, I then elute the antibiotic from the resin employing a dilute aqueous solution of a base, such as, for example, sodium hydroxide, ammonium hydroxide, etc. I prefer to use sodium hydroxide.

Any suitable method for adsorbing the cycloserine on the cation exchange resin can be used. I prefer to pass the aqueous solution of the antibiotic through a column containing the resin until the maximum amount of the antibiotic has been adsorbed on the resin as indicated by a break-through of the antibiotic, which is then found in increasing quantities in the run-off from the column. In eluting the antibiotic from the resin, dilute basic eluting agent such as sodium hydroxide is passed through the column until the antibiotic has been completely eluted as indicated by decreasing amounts of and finally a lack of the antibiotic in the eluate run-off.

Following elution of cycloserine from the strongly acidic cation exchange resin, the cycloserine can be recovered from the concentrated eluate by any convenient method, such as, for example, by precipitating the cycloserine as a water-insoluble crystalline metal salt. Suitable metallic cations which form insoluble salts with cycloserine include silver, copper, mercury, zinc and aluminum, and water-soluble salts of these metals can be added to the aqueous solution of the antibiotic and the antibiotic precipitated as the metal salt of the metal employed. The insoluble metal salt of cycloserine can then be removed from the supernatant by any convenient means, such as by filtration, centrifugation, etc. The insoluble metal salt of cycloserine can then be slurried in water and a material added thereto capable of precipitating the metal ion as an insoluble salt thus liberating the cycloserine which goes into solution in the water present. For example, the silver salt of cycloserine can be slurried in water and hydrochloric acid added thereto, the silver precipitating as silver chloride, while the cycloserine goes into aqueous solution in the free acid form. Residual traces of silver can then be removed by treating with hydrogen sulfide and filtering. The cycloserine can then be recovered from the aqueous solution by freeze drying under vacuum to obtain an amorphous preparation of very high purity or the cycloserine can be crystallized from the aqueous solution by adding to the solution a water miscible solvent in which cycloserine is insoluble.

The process for regenerating the acidic cation exchange resin is within the skill of the art, a convenient method being to pass a 5% sulfuric acid solution through the column until the runoff from the column has a titratable acidity of about 80–90% of the regenerating acid.

The following example is offered to illustrate my invention; however, I do not intend to be limited to the specific materials or procedures shown, but rather it is intended for my invention to include all equivalents within the scope of this specification and the attached claim.

EXAMPLE I

A 32,000 ml. portion of nutrient fermentation medium containing 1500 micrograms of cycloserine per ml., the nutrient medium being that in which the cycloserine was produced by fermentation employing the organism *Streptomyces orchidaceous* was adjusted to pH 5.0 with phosphoric acid and the solution filtered with a filter aid. To 22,290 ml. of the filtered nutrient medium was added 55.7 grams of oxalic acid to precipitate the calcium therein as calcium oxalate. The precipitated calcium oxalate was removed from the filtrate by filtration with a filter aid. 22,290 ml. of the essentially calcium-free filtrate was then passed through a column containing 1000 cc. of Amberlite IR–120 (a strongly acidic cation exchange resin) in the hydrogen form. The column was a Pyrex tube, 2 by 48 inches. The resin effluent was collected at a rate of 100 ml. per minute until all of the solution had passed through the resin bed, after which the column was washed with deionized water and the cycloserine then eluted with 4% sodium hydroxide, the eluate being collected in ten 400 ml. fractions. During elution there was a slight accumulation of calcium hydroxide, but not in amounts sufficient to interfere with the operation of the column. The eluate fractions were assayed for cycloserine activity and the results are given in the table below.

Table I

| Eluate Fraction | Vol., Ml. | Cycloserine, $\mu g./ml.$ |
|---|---|---|
| 1 | 400 | 20 |
| 2 | 400 | 40 |
| 3 | 400 | 750 |
| 4 | 400 | 16,200 |
| 5 | 400 | 16,200 |
| 6 | 400 | 8,900 |
| 7 | 400 | 5,300 |
| 8 | 400 | 2,700 |
| 9 | 400 | 1,750 |
| 10 | 400 | 1,400 |

The more active fractions (4–10) were combined to give 2,800 ml. of rich eluate containing 23,600,000 micrograms of cycloserine. The rich eluate was treated with activated char and then adjusted to pH 6.5 with dilute aqueous sodium hydroxide. The cycloserine was then precipitated from the eluate as the insoluble silver salt by the addition of 38.4 grams of silver nitrate. The silver salt of cycloserine precipitated in crystalline form in the amount of 40.4 grams containing 19,000,000 micrograms of cycloserine. Following the elution the column was washed with about 1 liter of tap water and the resin was then reconverted to the hydrogen form by passing downflow through the column 2000 ml. of ½ normal sulfuric acid. Due to the fact that only a small amount of calcium hydroxide was deposited on the resin, the sulfuric acid regeneration of the resin proceeded without plugging the resin with calcium sulfate.

Now having described my invention, what I claim is:

In a process for the recovery of cycloserine from an impure aqueous solution containing calcium by adsorbing cycloserine on a strongly acidic cation exchange resin which resin is regenerated with sulfuric acid, eluting the cycloserine from the resin, precipitating cycloserine from the eluate as a water-insoluble salt and recovering the insoluble cycloserine salt to obtain free cycloserine, the improvement which comprises adding oxalic acid to the impure aqueous solution of cycloserine and removing the precipitated calcium oxalate prior to adsorbing the cycloserine on the ion exchange resin.

References Cited in the file of this patent

UNITED STATES PATENTS

| 2,773,878 | Shull et al. | Dec. 11, 1956 |
| 2,789,983 | Harned | Apr. 23, 1957 |
| 2,832,788 | Harris et al. | Apr. 29, 1958 |
| 2,862,003 | Kirchensteiner et al. | Nov. 25, 1958 |

FOREIGN PATENTS

| 768,007 | Great Britain | Feb. 13, 1957 |

OTHER REFERENCES

Scott's Standard Methods of Chem. Analysis (Furman, 5th ed., Van Nostrand), vol. 1, pages 210–212 (1939).